(12) United States Patent
Ito (10) Patent No.: US 10,999,509 B2
(45) Date of Patent: May 4, 2021

(54) SYSTEMS, METHODS, AND MEDIUMS FOR CONTROLLING IMAGE STABILIZATION BASED ON IMAGING CONDITION

(71) Applicant: CANON KABUSHIKI KAISHA, Tokyo (JP)

(72) Inventor: Rumi Ito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/672,649

(22) Filed: Nov. 4, 2019

(65) Prior Publication Data
US 2020/0162674 A1 May 21, 2020

(30) Foreign Application Priority Data

Nov. 15, 2018 (JP) .............................. JP2018-214846
Sep. 19, 2019 (JP) .............................. JP2019-170079

(51) Int. Cl.
*H04N 5/232* (2006.01)
(52) U.S. Cl.
CPC ..... *H04N 5/23287* (2013.01); *H04N 5/23209* (2013.01); *H04N 5/23245* (2013.01)
(58) Field of Classification Search
CPC .......... H04N 5/23209; H04N 5/23245; H04N 5/23287; G02B 7/102; G03B 17/14
See application file for complete search history.

(56) References Cited

U.S. PATENT DOCUMENTS

| 9,876,958 B2 | 1/2018 | Sakurai | |
|---|---|---|---|
| 2015/0264266 A1* | 9/2015 | Katsuyama | H04N 5/23209 348/208.2 |
| 2016/0330377 A1* | 11/2016 | Tsuchiya | G03B 17/14 |
| 2017/0272655 A1* | 9/2017 | Sakurai | H04N 5/2327 |
| 2019/0215454 A1* | 7/2019 | Kimura | H04N 5/23209 |
| 2019/0230288 A1* | 7/2019 | Tsuchiya | G02B 27/646 |

FOREIGN PATENT DOCUMENTS

| JP | 2009265182 A | 11/2009 |
|---|---|---|
| JP | 2015194712 A | 11/2015 |

* cited by examiner

*Primary Examiner* — Paul M Berardesca
(74) *Attorney, Agent, or Firm* — Rossi, Kimms & McDowell LLP (57) ABSTRACT

A lens apparatus attachable to a camera that includes a first corrector configured to move configured to move for an image stabilization includes a second corrector configured to move for the image stabilization, and a controller configured to control, based on an imaging condition, the second corrector according to a first drive that moves both the first corrector and the second corrector during imaging, or a second drive that moves only one of the first corrector and the second corrector during the imaging.

14 Claims, 7 Drawing Sheets

SYSTEMS, METHODS, AND MEDIUMS FOR CONTROLLING IMAGE STABILIZATION BASED ON IMAGING CONDITION

BACKGROUND OF THE INVENTION

Field of the Invention

The present invention relates to an optical apparatus, such as an interchangeable lens and a camera, used for an imaging system having an image stabilization function.

Description of the Related Art

One interchangeable lens type imaging system having an image stabilization function for optically reducing (correcting) an image blur moves a correction lens provided in an interchangeable lens relative to an optical axis and moves an image sensor provided in the camera relative to the optical axis, as disclosed in Japanese Patent Laid-Open Nos. ("JPs") 2009-265182 and 2015-194712. The imaging system disclosed in JP 2009-265182 provides the image stabilization through the correction lens before imaging starts (before the exposure starts), and moves both the correction lens and the image sensor for the image stabilization during the imaging. This imaging system calculates a moving amount of the image sensor during imaging according to the position of the correction lens when the imaging starts. The imaging system disclosed in JP 2015-194712 controls a movement of the correction lens for the image stabilization after the correction lens is moved to the center position of the movable range when the imaging starts.

The imaging systems disclosed in JPs 2009-265182 and 2015-194712 need a long time to prepare for the image stabilization due to the calculation of the moving amount of the image sensor and the movement of the correction lens to the center position in the movable range. For this reason, for example, when the image stabilization is performed by moving both the correction lens and the image sensor during imaging in continuous image capturing, the continuous capturing speed may become lower depending on the calculation time and the movement time of the correction lens.

SUMMARY OF THE INVENTION

The present invention provides an optical apparatus that can perform a good image stabilization during imaging.

A lens apparatus according to one aspect of the present invention is attachable to a camera that includes a first corrector configured to move configured to move for an image stabilization and includes a second corrector configured to move for the image stabilization, and a controller configured to control, based on an imaging condition, the second corrector according to a first drive that moves both the first corrector and the second corrector during imaging, or a second drive that moves only one of the first corrector and the second corrector during the imaging.

A camera according to another aspect of the present invention to which a lens apparatus is attached includes a first corrector configured to move for an image stabilization, and a controller configured to control the first corrector. The lens apparatus includes a second corrector configured to move for the image stabilization, a determiner configured to control, based on an imaging condition, the second corrector according to a first drive that moves both the first corrector and the second corrector during imaging, or a second drive that moves only one of the first corrector and the second corrector during the imaging, and a lens side notifier configured to notify the camera of a determination result of the determiner. The controller controls the first corrector according to the first drive or the second drive based on the determination result of the determiner notified from the lens apparatus.

A camera according to another aspect of the present invention to which a lens apparatus is attached includes a first corrector configured to move for an image stabilization, and a controller configured to control the first corrector. The lens apparatus includes a second corrector configured to move for an image stabilization. The controller controls, based on an imaging condition, the first corrector according to a first drive that moves both the first corrector and the second corrector during imaging, or a second drive that moves only one of the first corrector and the second corrector during the imaging.

A control method of an imaging system according to another aspect of the present invention that includes a camera having a first corrector configured to move for an image stabilization and a lens apparatus having a second corrector configured to move for the image stabilization includes the steps of acquiring an imaging condition, and controlling, based on the imaging condition, the second corrector according to a first drive that moves both the first corrector and the second corrector during imaging, or a second drive that moves only one of the first corrector and the second corrector during the imaging. A non-transitory computer-readable storage medium storing a program for causing a computer to execute the control method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
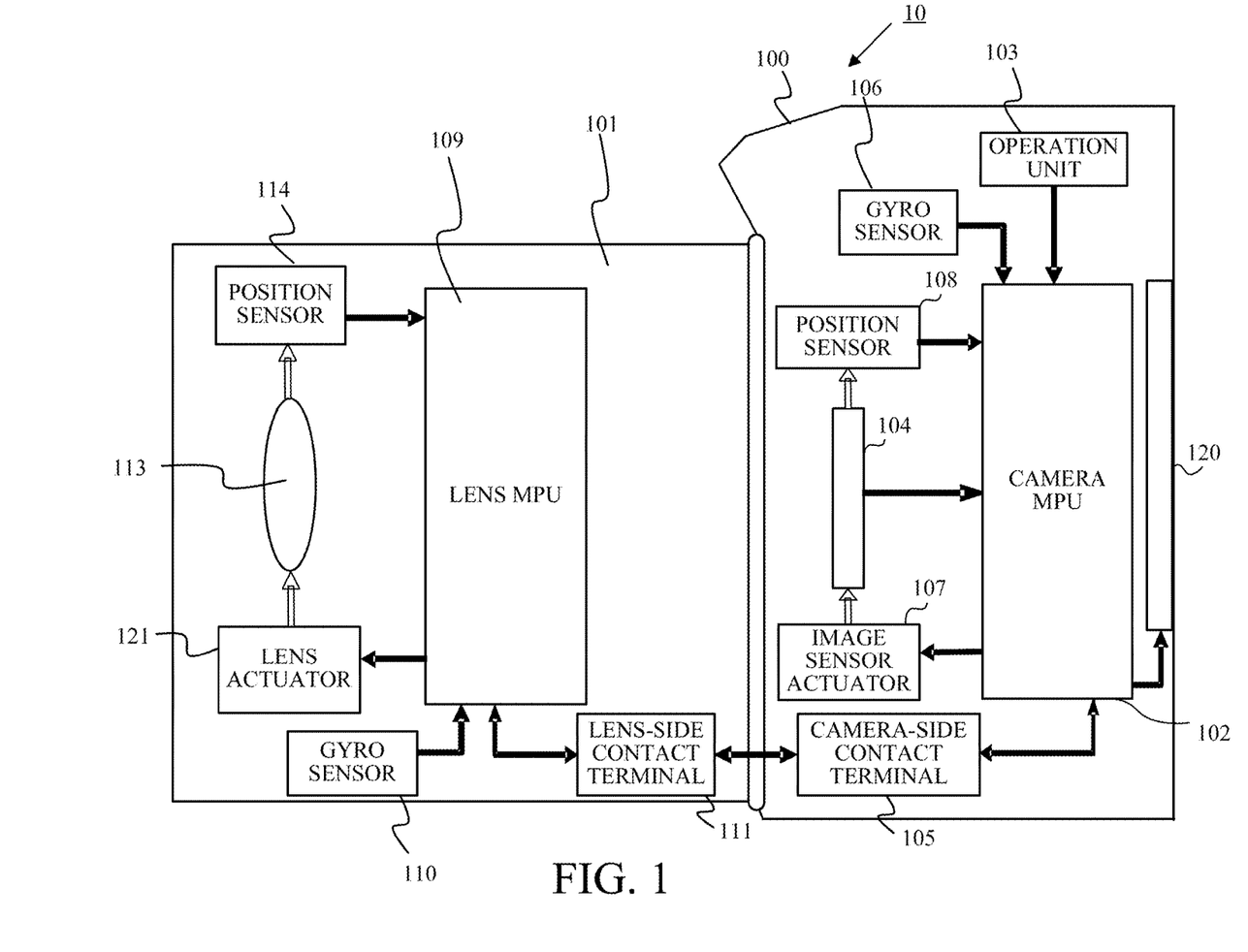
FIG. 1 is a block diagram illustrating a configuration of an imaging system according to a first embodiment of the present invention.

FIG. 1 illustrates a configuration of an imaging system 10 according to a first embodiment of the present invention. The imaging system 10 includes an interchangeable lens 101 as a first optical apparatus, and a camera body 100 as a second optical apparatus to which the interchangeable lens 101 is detachably attached and communicably connected.

The camera body 100 includes a camera MPU 102, an operation unit 103, an image sensor 104, a camera-side contact terminal 105, a camera-side gyro sensor 106, and a rear display 120.

The camera MPU 102 is a controller that governs the overall control of the camera body 100 and the interchangeable lens 101, and controls a variety of operations such as the AE (autoexposure control), AF (autofocus), and imaging in accordance with an input from an operation unit 103 described later. The camera MPU 102 communicates various commands and information with a lens MPU 109 through the camera-side contact terminal 105 and a lens-side contact terminal 111 provided on the interchangeable lens 101. The camera-side contact terminal 105 and the lens-side contact terminal 111 also include a power supply terminal for supplying a power from the camera body 100 to the interchangeable lens 101.

The operation unit 103 includes a mode dial for setting various imaging modes, a release button for instructing an imaging preparation operation and imaging start, and the like. A first switch (SW1) is turned on by half-pressing the release button, and a second switch (SW2) is turned on by fully pressing the release button. The AE and AF are performed as an imaging preparation operation when the SW1 is turned on, the imaging start is instructed when the SW2 is turned on (SW2-1 ON), and the imaging starts a predetermined time after the instruction (SW2-2 ON). The SW2-1 and SW2-2 are turned off when the imaging is completed. Turning off and on of each of the SW1, SW2-1, and SW2-2 is notified from the camera MPU 102 to the lens MPU 109 by communications.

The image sensor 104 includes a photoelectric conversion element such as a CCD sensor and a CMOS sensor, and generates an imaging signal by photoelectrically converting an object image formed by an imaging optical system described later. The camera MPU 102 generates an image signal using the image signal from the image sensor 104.

The camera-side gyro sensor 106 detects an angular vibration (camera shake) of the camera body 100 due to a manual shake or the like, and outputs an angular velocity signal. The camera MPU 102 drives an image sensor actuator 107 based on the angular velocity signal output from the camera-side gyro sensor 106 and moves the image sensor (first corrector) 104 in a direction orthogonal to the optical axis of the imaging optical system described later. Thereby, an image blur caused by the camera shake is reduced (corrected). At this time, the camera MPU 102 performs a feedback control over the image sensor actuator 107 so that the position of the image sensor 104 detected by the image sensor position sensor 108 approaches to a target position. Thereby, an image stabilization (referred to as IIS hereinafter) by moving the image sensor 104 is performed. The IIS is performed for the camera shake in the vertical direction (pitch direction) and the camera shake in the horizontal direction (yaw direction).

The rear display 120 serves as a display unit and displays an image corresponding to an image signal generated by the camera MPU 102 using an imaging signal from the image sensor 104. Before imaging, the user can observe the displayed image as a viewfinder image (live-view image). In addition, after the imaging, a still or motion image for recording generated by the imaging can be displayed on the rear display 120. The "imaging" in this embodiment means imaging for recording.

The interchangeable lens 101 includes an unillustrated imaging optical system, the lens MPU 109, the lens-side contact terminal 111, and a lens-side gyro sensor 110 described above. The lens-side gyro sensor 110 detects an angular shake (lens shake) of the interchangeable lens 101 and outputs an angular velocity signal.

The lens MPU 109 drives the lens actuator 112 based on the angular velocity signal output from the lens-side gyro sensor 110 and an OIS correction ratio described later, and moves a correction lens (second corrector) 113 that is part of the imaging optical system in the direction orthogonal to the optical axis of the imaging optical system. Thereby, an image blur caused by the lens shake is reduced (corrected). At this time, the lens MPU 109 performs a feedback control over the lens actuator 112 so that the position of the correction lens 113 detected by the lens position sensor 114 approaches to the target position. Thereby, the image stabilization (referred to as OIS hereinafter) by moving the correction lens 113 is performed.

The OIS is also performed for the lens shake in the pitch direction and the lens shake in the yaw direction, similar to the IIS. The correction lens 113 may move in a direction orthogonal to the optical axis, and may move on a plane orthogonal to the optical axis, or rotate and move in the direction around the optical axis as a center.

Figure 2:
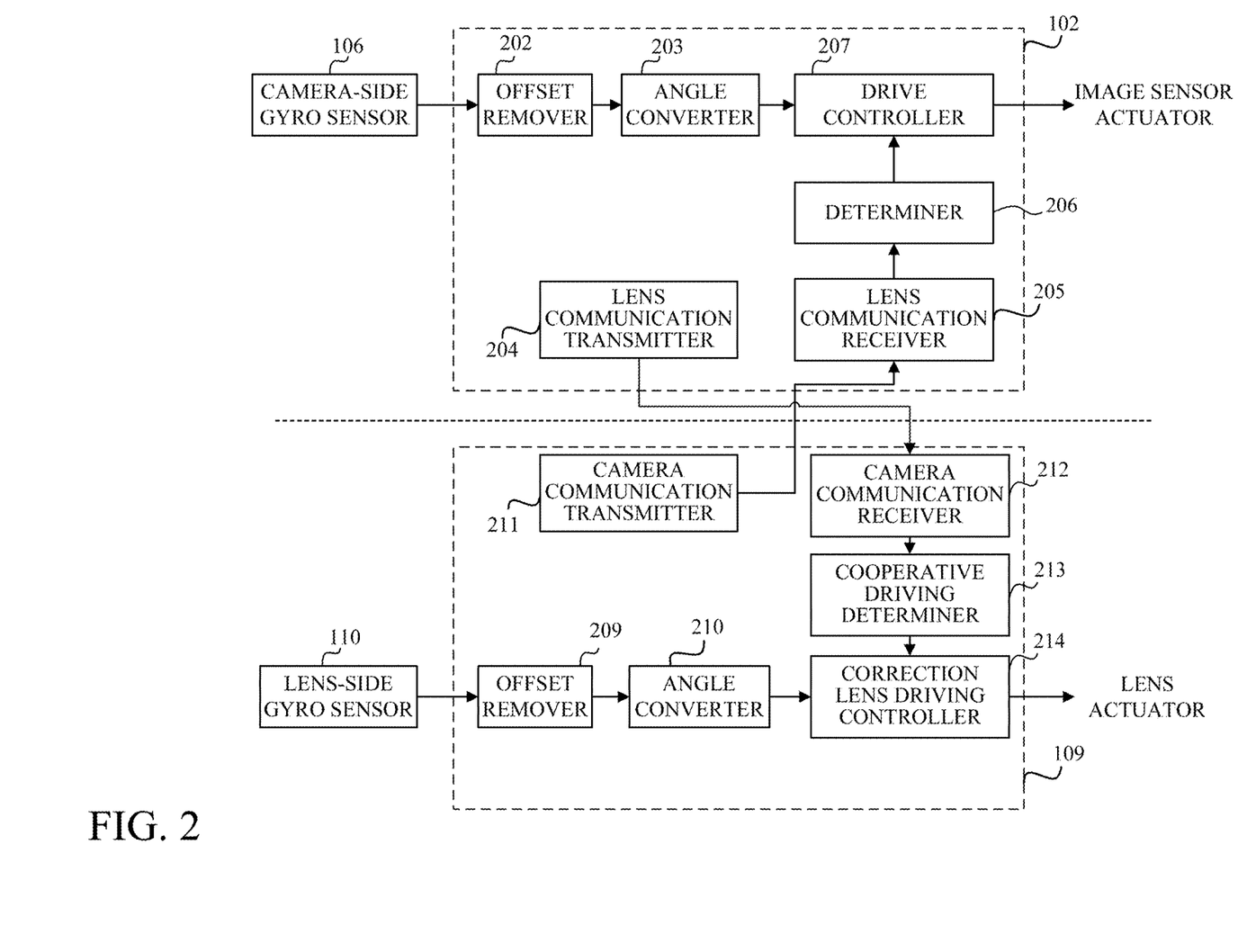
FIG. 2 is a block diagram showing a configuration of an image stabilization unit according to the first embodiment.

Referring now to FIG. 2, a description will be given of configurations relating to the IIS and the OIS according to this embodiment. FIG. 2 illustrates a configuration of the camera MPU 102 serving as a controller and a configuration inside the lens MPU 109 serving as the controller.

In the camera MPU 102, an offset remover 202 removes an offset component from the angular velocity signal from the camera-side gyro sensor 106. An angle converter 203 converts an angular velocity signal output from the offset remover 202 into an angle signal. A lens communication receiver 205 receives information on an image stabilization transmitted from a camera communication transmitter 211 in the lens MPU 109. As will be described in detail later, the determiner 206 determines whether or not cooperative driving of the IIS and the OIS during imaging or the first drive is to be performed which moves both the image sensor 104 and the correction lens 113 for the image stabilization during imaging. In other words, the determiner 206 determines whether the cooperative driving of the IIS and the OIS is to be permitted. The drive control unit 207 in the camera MPU 102 performs a control according to the first drive described above and the determination result of the determiner 206, or a control according to the second drive configured to move only one of the image sensor 104 and the correction lens 113 during imaging. More specifically, an IIS drive signal to be output to the image sensor actuator 107 is generated according to the angle signal from the angle converter 203 and the determination result acquired from the determiner 206. The image sensor 104 is driven at a predetermined correction ratio described later during imaging in the control according to the first drive, and the image stabilization is performed using only the image sensor 104 during imaging in the control according to the second drive or the image sensor 104 is stopped.

On the other hand, in the lens MPU 109, an offset remover 209 removes a offset component from the lens shake detection signal (angular velocity signal) from the lens-side gyro sensor 110. An angle converter 210 converts the angular velocity signal output from the offset removal unit 209 into an angle signal. A camera communication receiver 212 receives information on an image stabilization transmitted from the lens communication transmitter 204. Similar to the determiner 206, a determiner 213 determines whether to perform (permit) the cooperative driving of the IIS and OIS. A correction lens driving control unit 214 generates an OIS drive signal to be output to the lens actuator 112 according to the angle signal from the angle converter 210 and the determination result acquired from the determiner 213.

In this embodiment, the camera MPU 102 and the lens MPU 109 determine whether the cooperative driving of IIS and OIS is to be performed, but one of the camera MPU 102 and the lens MPU 109 may make the determination and the determination result may be sent to the other through the communication. The communicatee that has received the notice performs the control according to the first drive that is the cooperative drive of IIS and OIS, or the second drive that drives only one of them. In this embodiment, the camera MPU 102 and the lens MPU 109 generate an IIS drive signal and an OIS drive signal using the output from the camera-side gyro sensor 106 and the output from the lens-side gyro sensor 110, respectively. However, the present invention is not limited to this embodiment, and one of the camera MPU 102 and the lens MPU 109 may generate both the IIS drive signal and the OIS drive signal, and sends the IIS drive signal or the OIS drive signal to the other.

Figure 3:
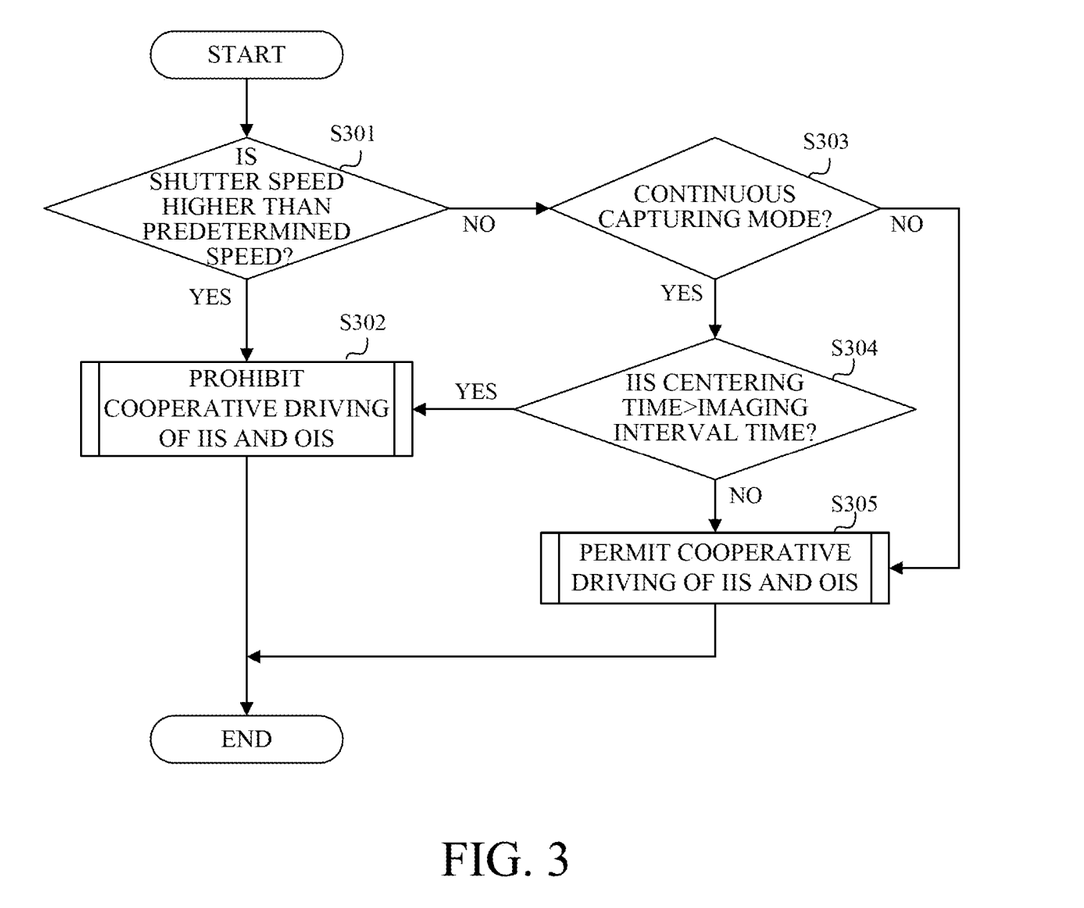
FIG. 3 is a flowchart showing determination processing according to the first embodiment.

Referring now to a flowchart in FIG. 3, a description will be given of determination processing for determining whether or not the cooperative driving executed by the camera MPU 102 (determiner 206) is to be permitted. The camera MPU 102 as a computer executes this processing and other processing described later according to a computer program. In this embodiment, the camera MPU 102 makes different the image stabilization method according to the imaging condition in the imaging system 10. In other words, according to the imaging condition, the control is made which corresponds to the first drive that moves both the image sensor 104 and the correction lens 113 in the image stabilization or the second drive that moves only one of the image sensor 104 and the correction lens 113 in the image stabilization. Herein, the imaging condition includes a condition relating to the shutter speed, information on whether or not the continuous capturing mode is set, and a condition relating to an imaging interval time (described later). The determination processing described using the flowchart of FIG. 3 is similarly performed by the lens MPU 109. For this determination, the lens MPU 109 receives information on the imaging condition from the camera MPU 102 in advance.

When the power is supplied to the interchangeable lens 101 after the camera body 100 is powered on and the communication starts between the camera body 100 and the interchangeable lens 101, the camera MPU 102 and the lens MPU 109 start this processing. One of the camera MPU 102 and the lens MPU 109 will be referred to as an MPU.

First, in the step S301, the camera MPU 102 determines whether or not the shutter speed during imaging is set higher than a predetermined speed (such as 1/500 seconds). The camera MPU 102 proceeds to the step S302 when the shutter speed is set higher than the predetermined speed, and proceeds to the step S303 when the shutter speed is set lower than the predetermined speed.

In the step S303, the camera MPU 102 determines whether or not the continuous capturing mode is set to the imaging mode in the camera body 100. If the continuous capturing mode is set, the camera MPU 102 proceeds to the step S304. If the continuous capturing mode is not set (single image capturing mode is set), the camera MPU 102 proceeds to the step S305.

In the step S304, the camera MPU 102 determines whether the time for returning the image sensor 104 to its movement center position prior to executing the IIS or whether the time for centering the image sensor 104 (referred to as IIS centering time hereinafter) is longer than the imaging interval time during continuous image capturing. The imaging interval time is an interval time between two consecutive imaging operations performed in the continuous capturing. In other words, this is the time interval during the continuous capturing from when the SW2-2 is turned off after capturing a certain frame (first imaging) ends to when the SW2-2 is turned on next time and the next imaging (second imaging) starts. The camera MPU 102 proceeds to the step S302 when the IIS centering time is longer than the imaging interval time, and proceeds to the step S305 when the IIS centering time is shorter than (or equal to) the imaging interval time.

In the step S302, the camera MPU 102 prohibits (does not permit) the cooperative driving of the IIS and the OIS. In this case, the image stabilization is performed with only one of the IIS and the OIS without the other. On the other hand, in the step S305, the camera MPU 102 permits the cooperative driving of the IIS and the OIS. Thereby, the image stabilization by the cooperative driving of the IIS and the OIS is performed.

The cooperative driving of the IIS and the OIS during imaging can correct an image blur larger than that in the image stabilization with the IIS or the OIS. On the other hand, when the shutter speed is high, or when centering is not finished in time during the imaging interval, the image stabilization is performed with only the IIS or the OIS during imaging. This configuration can prevent the continuous capturing speed from becoming lower or the start of the next imaging from being delayed by prohibiting a compulsory execution of the cooperative driving of the IIS and the OIS.

Figure 4:
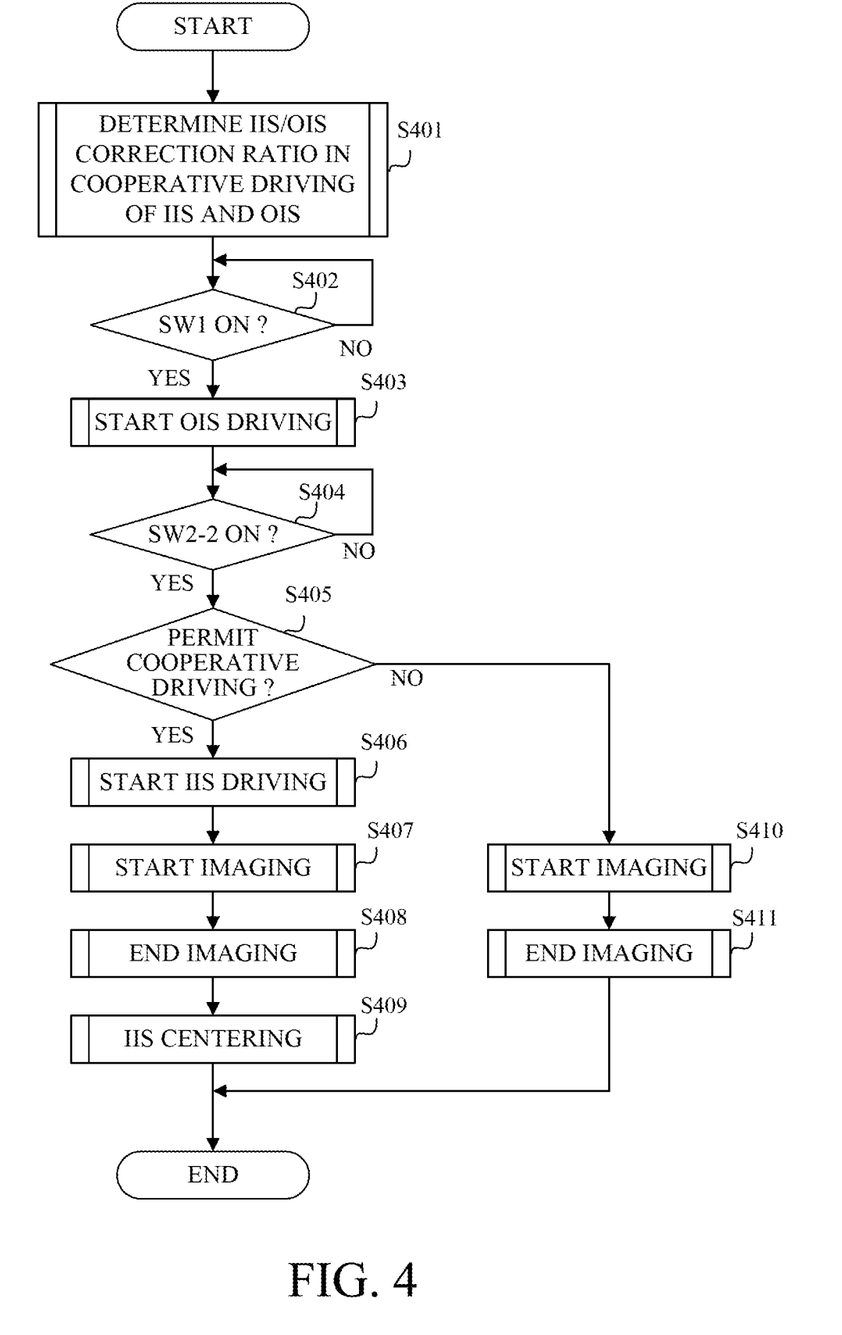
FIG. 4 is a flowchart showing image stabilization processing according to the first embodiment.

Referring now to a flowchart in FIG. 4, a description will be given of the image stabilization processing executed by the camera MPU 102. Initially, in the step S401, at least one of the camera MPU 102 and the lens MPU 109 calculates and sets the IIS correction ratio and an OIS correction ratio for the cooperative driving of the IIS and the OIS. The IIS correction ratio is a ratio of the image stabilization amount caused by moving the image sensor 104 to a total image stabilization amount (angle (degree)) caused by moving the image sensor 104 and the correction lens 113 for both the IIS and the OIS. The OIS correction ratio is a ratio of the image stabilization amount caused by moving the correction lens 113 to the total image stabilization amount. These IIS and OIS correction ratios may be predetermined ratios, or may be set using parameters stored in the camera body 100 or the interchangeable lens 101. Usually, the IIS and the OIS correction ratios are set so that the IIS and OIS can correct the image blur by the total image stabilization amount.

Next, in the step S402, the camera MPU 102 determines whether or not the SW1 is turned on. If the SW1 is turned on, the flow proceeds to the step S403, and if the SW1 is turned off, the determination in the step S402 is repeated.

In the step S403, the lens MPU 109 starts driving the OIS. Then, the flow proceeds to the step S404.

In the step S404, the camera MPU 102 determines whether or not the SW2-2 is turned on. If the SW2-2 is turned on, the flow proceeds to the step S405. If the SW2-2 is turned off, the determination in the step S404 is repeated.

In the step S405, the camera MPU 102 determines whether the cooperative driving of the IIS and the OIS is permitted by the above determination processing. If the cooperative driving is permitted, the flow proceeds to the step S406, and if the cooperative driving is prohibited (not permitted), the flow proceeds to the step S410.

In the step S406, the camera MPU 102 starts driving the IIS. Then, the flow proceeds to the step S407.

In the step S407, the camera MPU 102 starts imaging (single frame imaging in the continuous capturing mode). During imaging in the step S407, the camera MPU 102 and the lens MPU 109 correct an image blur by driving both IIS and OIS at the IIS and OIS correction ratios.

Next, in the step S408, the camera MPU 102 ends the imaging. In the step S409, the camera MPU 102 centers the image sensor 104, and ends the image stabilization processing after the centering is completed.

On the other hand, in the step S410, the camera MPU 102 starts imaging. During the imaging in the step S410, since the cooperative driving of the IIS and the OIS is prohibited, the camera MPU 102 does not drive the IIS, and the lens MPU 109 corrects the image blur by driving the OIS.

According to this embodiment, this operation corresponds to a control of the camera MPU 102 which does not drive the IIS, and a control of the lens MPU 109 which drives the OIS and provides the image stabilization. In the above description, a replacement between the IIS and the OIS constitutes part of the present invention. In other words, when the cooperative driving of the IIS and the OIS is prohibited as the second drive, the control may be performed that provides the image stabilization through the IIS without driving the OIS.

Next, in the step S411, the camera MPU 102 ends the image stabilization processing and ends the imaging.

Figure 7A:
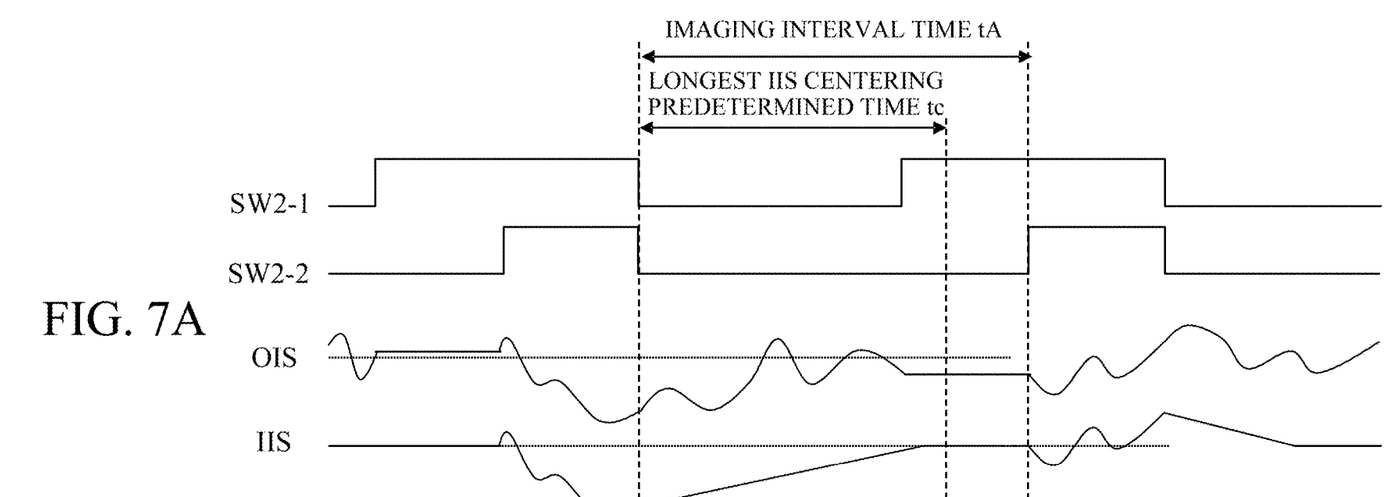
FIGS. 7A and 7B explain an image stabilization according to the first embodiment.
Figure 7B:
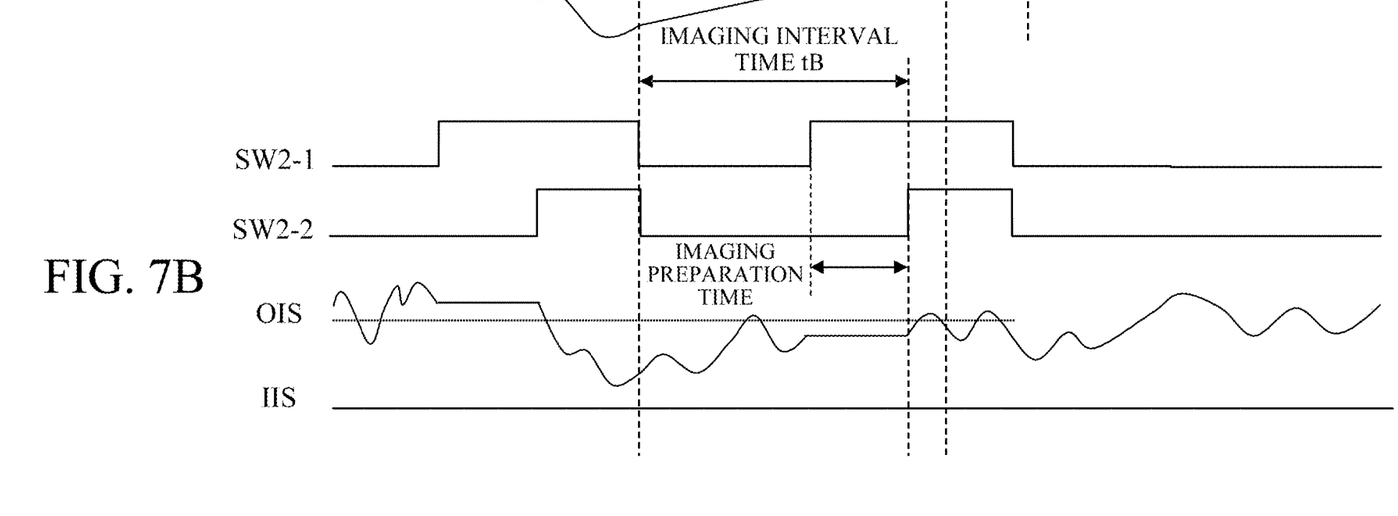

FIGS. 7A and 7B illustrate the driving of the OIS and the IIS in two continuous capturing modes with different imaging interval times. In FIG. 7A, an imaging interval time tA is longer than the longest IIS centering time tc, which is the IIS centering time when the image sensor 104 is centered from the position farthest from the movement center position to the movement center position. In this case, the cooperative driving of the IIS and the OIS during imaging is permitted, and the image stabilization is provided with both the IIS and the OIS. On the other hand, in FIG. 7B, an imaging interval time tB is shorter than the longest IIS centering time tc. In this case, the cooperative driving of the IIS and the OIS during imaging is prohibited, and image stabilization is provided only with the OIS during imaging.

This embodiment determines, based on the relationship between the IIS centering time and the imaging interval time, whether or not the cooperative driving of the IIS and the OIS is to be permitted, but whether the cooperative driving is permitted may be determined based on the relationship between the time other than the IIS centering time and the imaging interval time.

Second Embodiment

Next follows a description of a second embodiment according to the present invention. The configuration of the imaging system (camera body and interchangeable lens) according to the second embodiment is the same as that of the first embodiment, and common elements will be designated by the same reference numerals as those of the first embodiment and a description thereof will be omitted.

This embodiment will describe other processing performed in addition to centering of the image sensor 104 as the imaging preparation in the cooperative driving of the IIS and the OIS. As a specific example of other processing, correction ratio setting processing will be described for setting (calculating) the IIS and OIS correction ratios during a period from when the SW2-1 is turned on to when SW2-2 is turned on. Further, in this embodiment, the camera MPU 102 and the lens MPU 109 determine whether or not the cooperative driving of the IIS and the OIS is to be performed, based on the imaging condition described in the first embodiment and the condition relating to the imaging preparation time (which will be described later) as another imaging condition.

Figure 5:
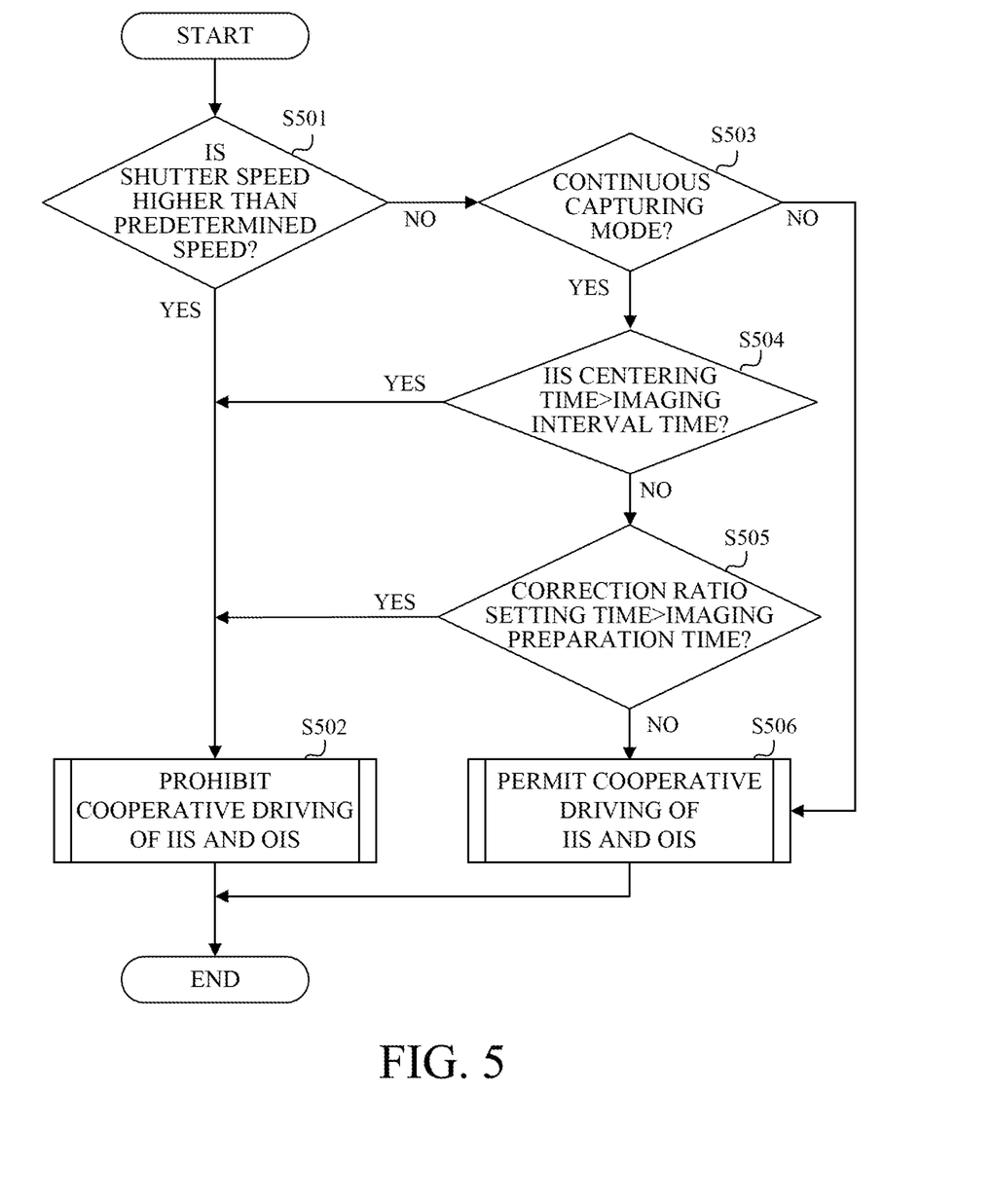
FIG. 5 is a flowchart showing determination processing according to a second embodiment of the present invention.

Referring to the flowchart of FIG. 5, a description will be given of processing for determining whether to permit the cooperative driving by the camera MPU 102 according to this embodiment. The steps S501 to S504 and S506 are the same as the steps S301 to S305 in the first embodiment, respectively. The determination processing described using the flowchart of FIG. 5 is similarly performed by the lens MPU 109. For this determination, the lens MPU 109 receives information on the imaging condition from the camera MPU 102 in advance.

In the step S505 following the step S504, the camera MPU 102 determines whether or not the set time required to set the correction ratio in the cooperative driving of the IIS and the OIS is longer than the imaging preparation time. The imaging preparation time is the time from when the SW2-1 is turned on to when the SW2-2 next time is turned on during the continuous capturing. The setting of the imaging preparation time can be changed by the user. The correction ratio setting processing includes processing in which at least one of the camera MPU 102 and the lens MPU 109 calculates the IIS correction ratio and the OIS correction ratio, processing that communicates information necessary for the calculation between the camera MPU 102 and the lens MPU 109, and processing that communicates the calculated IIS and OIS correction ratios between the camera MPU 102 and the lens MPU 109 for sharing.

If the time required to set the correction ratio is longer than the imaging preparation time, the camera MPU 102 proceeds to the step S502, and the camera MPU 102 proceeds to the step S506 if the time required to set the correction ratio is shorter than (or equal to) the imaging preparation time.

Thereby, the same effect as that of the first embodiment can be obtained. Further, by considering the correction ratio setting time, it is possible to prevent the correction ratio setting time from bottlenecking and the continuous capturing speed from becoming lower or the start of the next imaging from delaying.

Figure 6:
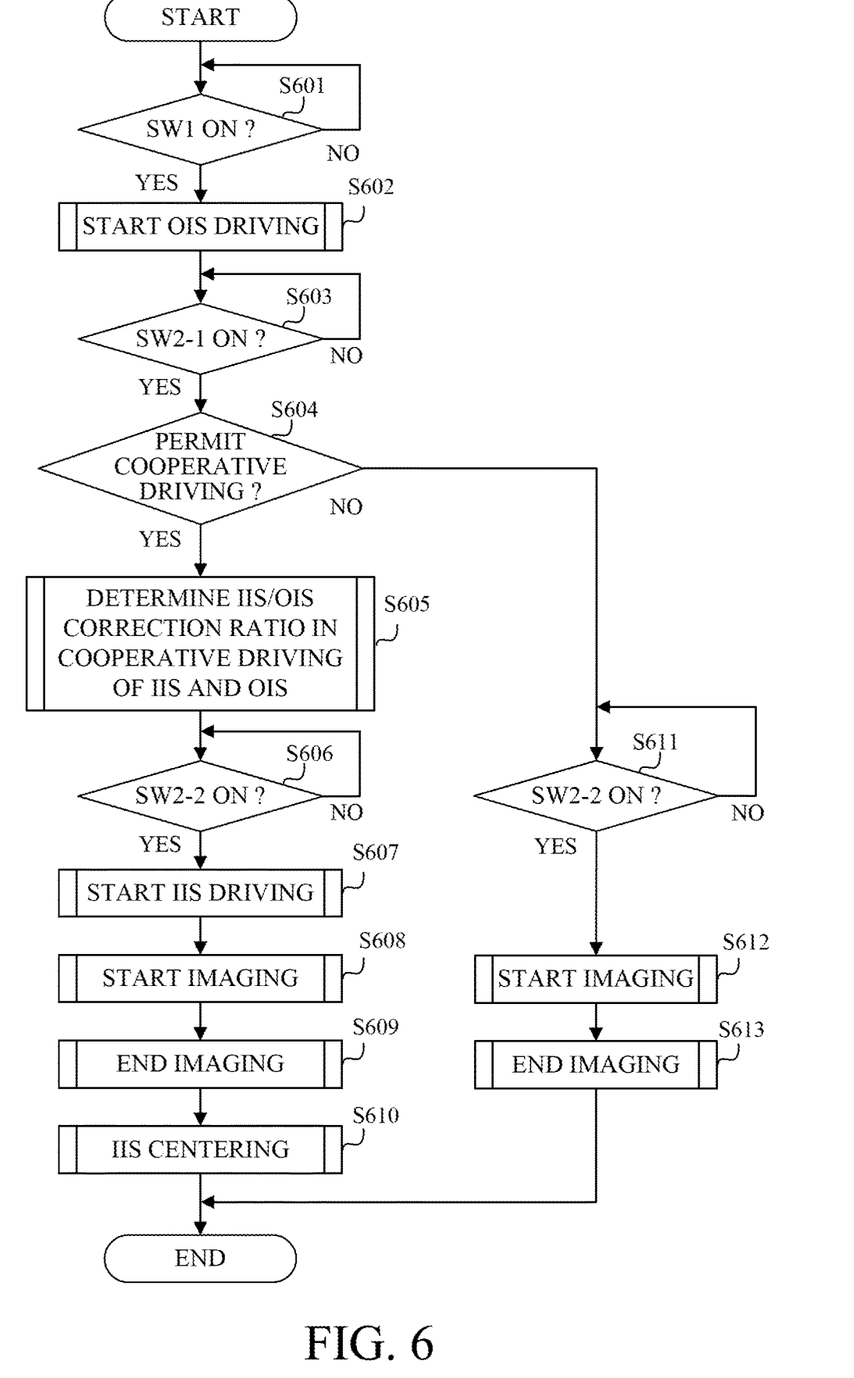
FIG. 6 is a flowchart showing image stabilization processing according to the second embodiment.

Referring now to FIG. 6, a description will be given of image stabilization processing executed by the camera MPU 102 and the lens MPU 109. First, in the step S601, the camera MPU 102 determines whether the SW1 is turned on. The camera MPU 102 proceeds to the step S602 when the SW1 is turned on, and repeats the determination in the step S601 when the SW1 is turned off.

In the step S602, the lens MPU 109 starts driving the OIS.

In the step S603, the camera MPU 102 determines whether the SW2-1 is turned on. If the SW2-1 is turned on, the flow proceeds to the step S604, and if the SW2-1 is turned off, the determination in the step S603 is repeated.

In the step S604, the camera MPU 102 determines whether the cooperative driving of the IIS and the OIS is permitted by the above determination processing. If the cooperative driving is permitted, the camera MPU 102 proceeds to the step S605. If the cooperative driving is prohibited, the camera MPU 102 proceeds to the step S611.

In the step S605, at least one of the camera MPU 102 and the lens MPU 109 performs the correction ratio setting processing for setting the IIS and OIS correction ratios when the cooperative driving of the IIS and the OIS is performed.

In the step S606, the camera MPU 102 determines whether the SW2-2 is turned on. If the SW2-2 is turned on, the flow proceeds to the step S607. If the SW2-2 is turned off, the determination in the step S606 is repeated.

The steps S607 to S610 are the same as the steps S406 to S409 in the first embodiment. In the step S611 next to the step S610, the camera MPU 102 determines whether or not the SW2-2 is turned on, and if SW2-2 is on, proceeds to the step S612. If SW2-2 is turned off, the determination in the step S611 is repeated. The steps S612 to S613 are the same as the steps S410 to S411 in the first embodiment.

This embodiment determines whether or not the cooperative driving of the IIS and the OIS is to be permitted, based on the relationship between the calculation of the correction ratio, the associated time required for the communication between the camera body 100 and the interchangeable lens 101, and the imaging preparation time. However, this embodiment may determine whether or not the cooperative driving is to be permitted, based on the relationship between the time required for other imaging preparation processing and the imaging preparation time.

Each embodiment performs the image stabilization with the OIS without the IIS before imaging starts. During imaging, the image stabilization is performed only with the OIS or the cooperative driving of the IIS and OIS, and the image sensor is centered after the imaging is completed. Alternatively, the image stabilization may be performed with the IIS drive without the OIS before the imaging starts, or the image stabilization may not be performed. When the cooperative driving of the IIS and the OIS is prohibited, the image stabilization may be performed with the IIS without the OIS. The correction lens may be returned to its movement center position or centered after the imaging is completed. A condition other than the shutter speed, the continuous capturing mode, the imaging interval time, and the imaging preparation time described in each embodiment may be added to the imaging condition for determining whether or not the cooperative driving is permitted.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2018-214846, filed on Nov. 15, 2018 and 2019-170079, filed on Sep. 19, 2019, which are hereby incorporated by reference herein in their entirety.

What is claimed is:

1. A lens apparatus attachable to a camera that includes a first corrector configured to move for an image stabilization, the lens apparatus comprising:
    a second corrector configured to move for the image stabilization; and
    a controller configured to control, based on an imaging condition, the second corrector according to a first drive that moves both the first corrector and the second corrector during imaging, or a second drive that moves only one of the first corrector and the second corrector during the imaging,
    wherein the imaging condition includes information on whether or not the imaging is performed by continuous capturing.

2. The lens apparatus according to claim 1,
    wherein the controller is configured to determine whether to perform the first drive based on the imaging condition, and
    wherein the controller is configured to control the second corrector according to the first drive or the second drive based on a determination result of the controller.

3. The lens apparatus according to claim 2, wherein the controller is configured to notify the camera of the determination result of the controller.

4. The lens apparatus according to claim 1, wherein the imaging condition includes a condition relating to a shutter speed in the imaging.

5. The lens apparatus according to claim 1, wherein the imaging condition includes a condition relating to an imaging interval time from first imaging to second imaging following the first imaging when the imaging is performed by continuous capturing.

6. The lens apparatus according to claim 5, wherein the controller is configured to control the second corrector according to the first drive when a centering time required for returning at least the first corrector, the second corrector, or both the first corrector and the second corrector to a respective movement center position from a respective position at an end of the first imaging is shorter than the imaging interval time, and the controller is configured to control the second corrector according to the second drive when the centering time is longer than the imaging interval time.

7. The lens apparatus according to claim 1, wherein the imaging condition includes a condition relating to an imaging preparation time from an imaging instruction to a start of imaging when the imaging is performed by continuous capturing.

8. The lens apparatus according to claim 7, wherein the is configured to control the second corrector according to the first drive when a set time required for setting a ratio of image stabilization amounts by the first and second corrector in the first drive is shorter than an imaging preparation time, and to control the second corrector according to the second drive when the set time is longer than the imaging preparation time.

9. The lens apparatus according to claim 1, wherein the controller is configured to move the second corrector in the image stabilization before the imaging.

10. The lens apparatus according to claim 1, wherein the controller is configured to drive the second corrector based on a predetermined correction ratio for a control of the second corrector according to the first drive, which is calculated for a total of an image stabilization performed by the first corrector and an image stabilization performed by the second corrector.

11. A camera to which a lens apparatus is attached, the camera comprising:
   a first corrector configured to move for an image stabilization; and
   a controller configured to control the first corrector,
   wherein the lens apparatus includes a second corrector configured to move for an image stabilization,
   wherein the controller is configured to control, based on an imaging condition, the first corrector according to a first drive that moves both the first corrector and the second corrector during imaging, or a second drive that moves only one of the first corrector and the second corrector during the imaging, and
   wherein the imaging condition includes information on whether or not the imaging is performed by continuous capturing.

12. A control method of an imaging system that includes a camera having a first corrector configured to move for an image stabilization and a lens apparatus having a second corrector configured to move for the image stabilization, the method comprising the steps of:
   acquiring an imaging condition; and
   controlling, based on the imaging condition, the second corrector according to a first drive that moves both the first corrector and the second corrector during imaging, or a second drive that moves only one of the first corrector and the second corrector during the imaging,
   wherein the imaging condition includes information on whether or not the imaging is performed by continuous capturing.

13. A non-transitory computer-readable storage medium storing a program for causing a computer to execute the control method according to claim 12.

14. A lens apparatus attachable to a camera that includes a first corrector configured to move for an image stabilization, the lens apparatus comprising:
   a second corrector configured to move for the image stabilization; and
   a controller configured to control, based on an imaging condition, the second corrector according to a first drive that moves both the first corrector and the second corrector during imaging, or a second drive that moves only one of the first corrector and the second corrector during the imaging,
   wherein the controller is configured to determine whether to perform the first drive based on the imaging condition,
   wherein the controller is configured to control the second corrector according to the first drive or the second drive based on a determination result of the controller, and
   wherein the controller is configured to notify the camera of the determination result of the controller.

* * * * *